United States Patent [19]

Medina et al.

[11] Patent Number: 4,695,130
[45] Date of Patent: Sep. 22, 1987

[54] CAMERA FLASH ATTACHMENT FOR THREE DIMENSIONAL IMAGING SYSTEMS

[76] Inventors: Antonio Medina, One Emerson Pl., Apt. 17J, Boston, Mass. 02114; Yehoshua Y. Zeevi, Pierre Hall, Harvard University, Cambridge, Mass. 02138

[21] Appl. No.: 762,414

[22] Filed: Aug. 5, 1985

Related U.S. Application Data

[63] Continuation-in-part of Ser. No. 537,514, Sep. 30, 1983.

[51] Int. Cl.[4] .................. G02B 27/22; G03B 15/02; G03B 15/08; G03B 11/00
[52] U.S. Cl. .................................. 350/132; 350/141; 350/144; 350/317; 354/112; 362/16; 362/18
[58] Field of Search ................ 350/130–133, 350/139, 141, 143, 145, 146, 317, 144; 351/45, 204, 202; 362/16–18; 354/103, 112

[56] References Cited

U.S. PATENT DOCUMENTS

| | | | |
|---|---|---|---|
| 1,481,006 | 1/1924 | Hammond | 350/130 |
| 2,748,764 | 6/1956 | Boyd et al. | 350/145 |
| 3,851,955 | 12/1974 | Kent et al. | 350/132 |

*Primary Examiner*—Jon W. Henry

[57] ABSTRACT

A means and method of generating disparate information for imparting depth perception to an image. An image is formed with a shadow from a plurality of energy sources. The energy sources each having a different locus. In one embodiment, using only two energy sources the image is detected by an image detector which permits the portion of the shadow formed by one energy source to be distinguished from the portion of the shadow formed by another source. In either a static-imaging system such as a still photograph or a dynamic system, such as television, means are provided for optically segregating the shadows viewed by each eye. In a monocular version of the dynamic imaging system, such as a motion picture film, a three-dimensional perception is created by successively displaying images formed with different shadows.

In a particular embodiment (of the present invention), a filter is provided for a conventional camera flash system. The filter comprises two light transmitting segments separated by an opaque segment. One light transmitting segment comprises a red filter while the other comprises a cyan filter. Thus, light from the flash source takes the form of two essentially complimentary wave bands eminating from distinct and separate sources. An image of an object taken before a screen using such system is formed with a separate shadow created by each of these sources. When viewed with the naked eye, the image has a substantially conventional appearance, but when viewed through a red filter in front of one eye and a cyan filter in front of the other, the image gives rise to a three dimensional effect.

6 Claims, 10 Drawing Figures

CAMERA FLASH ATTACHMENT FOR THREE DIMENSIONAL IMAGING SYSTEMS

BACKGROUND OF THE INVENTION

This invention relates to a means and method of imaging objects using a single-image detector and multiple energy sources to create disparate information which once segregated to the corresponding dyes generates the appearance of a three-dimensional image. Three-dimensional imaging of both static and dynamic images have been known for many years. Early efforts at three-dimensional imaging involved the use of the stereoscope in which were viewed a pair of images or photographs of the same object, obtained with two cameras or a camera with a split or multiple lens and in which the lenses were spaced apart. In the systems using two cameras, the lenses were essentially at an interoccular distance Thus, pairs of disparate images were formed and then viewed with a stereoscope in which each eye viewed the corresponding image. Subsequently, anaglyph stereoscopy was developed in which left and right images were chromatically coded by respected complementary color filters for viewing through corresponding glasses to separate the disparate images required for a three-dimensional effect. Variances of anaglyph stereoscopy were developed using a single-lens system such for example, as those described in Songer U.S. Pat. No. 4,312,199 and Beiser U.S. Pat. No. 4,290,675. The Songer patent exemplifies recent efforts to create a three-dimensional photographic system for both still and motion pictures which produces a compatible three-dimensional disparate information capable of being viewed, either with glasses for three-dimensional effect or viewed without glasses for a two-dimensional photographic effect. That system and others similar to it rely upon means for dividing the color spectrum into distinct images in the camera or image detector by a filter to simulate a multiple-lens system that required left and right eye resolution by appropriate filters or the like when the images are viewed. Such systems generally suffered from a variety of problems including for example, image distortion and blur, problems of image registry, viewer discomfort and fatigue resulting from foreground and background focusing problems, bulky attachments, costly components and other related difficulties.

A more recent effort to create a three-dimensional dynamic imaging system was partially described in a technology update appearing in *Popular Mechanics*, March 1983 entitled "3-D TV Is Here". In that article, there is an apparent description of a system for making three-dimensional television movies and slides which apparently require no special glasses, cameras, projectors or television sets. The system described generates a monocular depth effect by using conventional video equipment and an encoding device which produces a time-sequence display of images captured from two different points of view. In short, that system records images of an object from two loci spaced apart at an interoccular distance and then displays these disparate images in time-sequence on a single image projector such as a television. This system, like the conventional three-dimensional imaging and anaglyph stereoscopic displays previously described has a number of limitations which have precluded its general acceptance for commercial and other purposes. These limitations include specifically, significant difficulties in decoupling depth information from image jitter and in providing a smooth motion picture or a picture which does not create viewer fatigue.

These and a wide range of other methods exemplified or referenced in U.S. Pat. Nos. 1,372,645; 1,595,295; 2,235,743; 2,360,322; 2,568,327; 2,751,826; 3,039,358; 3,731,606; 3,810,213; 3,990,087; 4,009,951; 4,189,210 have not resulted in a generally accepted process for creating a three-dimensional image which can be used for dynamic and static display in photography, television, video taping and other optical or digital means of graphic representation of images.

OBJECTS AND SUMMARY OF INVENTION

The present invention provides an improved means and method of generating three-dimensional still or moving binocular images. In particular, it is an object of the present invention to provide an improved means and method of generating three-dimensional still photographs, motion pictures, video tapes, medical imagery such as X-rays, television images and other distance sensing devices such as those used in robotic and night vision displays.

A further object of the present invention is to provide an improved means and method of viewing three-dimensional still photographs or other images in which the viewer may selectively view a three-dimensional image using a viewing device or a two-dimensional simulation without aid of the device and without any apparent distortion of the two-dimensional image.

A further object of the present invention is to provide an improved means and method of forming a two dimensional or three-dimensional simulation of an image in which conventional image detecting and recording means of conventional design may be used including conventional still cameras, motion picture cameras, X-ray cameras, video tape and television cameras and the like, and in which a simulation of a three-dimensional image is created by comparatively inexpensive auxiliary system that is simple to make and operate.

A further object of the present invention is to provide an improved means and method of simulating three-dimensional images which, in one embodiment, permits a dynamic three-dimensional-like image presentation without the need of a viewing device such as glasses and in which the three-dimensional-like image may be presented on conventional image display devices such as motion picture projectors, video tape projectors and television.

A still further object and advantage of the present invention is to provide an improved means and method of displaying dynamic or moving three-dimensional-like images in which the bulk of the images are not blurred, are fully chromatic, do not jump or hop and have a smooth and non-eye disturbing or tiring presentation to the viewer.

A still further object of the present invention is to provide an improved means and method of simulating three-dimensional imagery in which the viewer may selectively choose to view the object as a three-dimensional object when viewed through an auxiliary device (glasses) or as a two-dimensional object without glasses, with the two- and three-dimensional images fully compatible with one another and displayable upon the same CRT or projector.

Another object of the present invention is to provide a means and method that will permit adaptation of existing equipment normally designed for two-dimensional photographic imagery such for example, as conventional 35 mm film to making of photographic images that may be viewed selectively as either two- or three-dimensional-like pictures.

Another object of the present invention is to provide an improved means and method of creating images for projection on television, video tapes and motion picture film in a manner which will allow the viewer to choose either two- or three-dimensional viewing without change or adaptation of the normal television, video tape, motion picture or other viewing system in use.

Another object of this invention is to provide a means and method of sensing relative distance of an objects from robotic equipment which will permit selective manipulation depending upon relative distance of the objects by the robotic equipment. A still further objective of this invention is to provide a means and method of simulating depth generated image. Such means and method are of particular use and advantage in such diverse computer activated equipment as computer games and computer generated imagery (CGI) for flight simulators.

One further object of this invention is to provide an improved means and method of medical imaging and in particular, for means and method for three-dimensional viewing utilizing conventional fundus camera equipment in combination with a comparatively simple means and method of adapting such equipment. Such system contemplates an improved means and method of retinal examination.

Another use of the principles of the present invention relates to medical imaging at ultrasonic frequencies in which the principles of the present invention may be used for in creating depth perceptions for mamographics and the like.

In the present invention, depth perception is created by multiply projecting an image of an object using multiple energy sources to create a plurality of images having different shadows. This is achieved by utilizing a plurality of energy sources to successively or simultaneously illuminate the object and thereby define its images. A single detector records the images of the object so defined by the multiple energy sources. More specifically, a single energy detector such for example as a photographic or television camera detects and records successively, images of an object which are successively defined for such recording by multiple energy sources such for example as multiple light sources. Thus, for example, a camera is used to photograph an object with the object illuminated for successive frames from light sources at spaced apart locations. When that system is used to define a static image in a still photograph, multiple pictures of the image will have varying shadows encoding disparate information. If the photographs are viewed in a stereoscope, a three-dimensional image will result. A similar system may be designed in which a single photograph may be made utilizing multiple light sources of distinct characteristics including, for example, one light source with a red filter and second light source with a blue filter where the union the two filtered light sources spans the spectrum of white light. The resultant photograph will display to the unaided eye a single, well-defined, relatively sharp picture of the image with blurs confined to shadows. However, if the picture is viewed through glasses having one red and one blue lens, the image as viewed will have a three-dimensional appearance. Such a system contemplates an attachment for a conventional 35 millimeter camera or instant camera having flash attachments. In such a system, a filter is provided for the flash attachment which permits taking of a photograph using light from the flash to create a photograph that has shadows separately formed by the two different filters. The photograph as formed may be viewed with the naked eye without significant distortion or, alternately, may be viewed through a conventional filter system with a red filter for one eye and a cyan filter for the other in a manner which synthesizes the three-dimensional image.

In a modification of the invention adapted specifically for use in a dynamic system, depth perception may be achieved without the use of glasses or other viewing aids. In such a system, an image detector such as a motion picture camera or television camera capable of taking successive frames of pictures in the conventional fashion is used. In this system, a plurality of spaced energy sources such as lights are synchronized with the camera so that successive frames of the exposed film are illuminated from these different light sources. The film when projected as a motion picture, video tape or television film will thus successively display frames illustrating the object which, in successive frames, has been illuminated from different and spaced light sources. When viewed, the image will have a three-dimensional or pseudo stereoptic effect which is not a true three-dimensional image, but is in substance, a dynamic shadowgram having an illusion of depth.

Thus, it is an object of the present invention to provide a method of creating a three-dimensional-like image of an object, consisting of directing onto an object radiant energy from a plurality of sources whereby a single detector such as a single lens camera that optically detects and records the image created by the radiant energy will record it with shadows of different characteristics, depending upon the specific energy source used for the particular image. Means are provided for segregating the portion of the shadow defined separately by the corresponding of the sources and for separately viewing one with each eye of the viewer, perceiving different ones of said images.

BRIEF DESCRIPTION OF THE DRAWINGS

The foregoing objects and advantages of the present invention will be more clearly understood when considered in conjunction with the accompanying drawings in which.

DETAILED DESCRIPTION OF THE INVENTION

Figure 1:
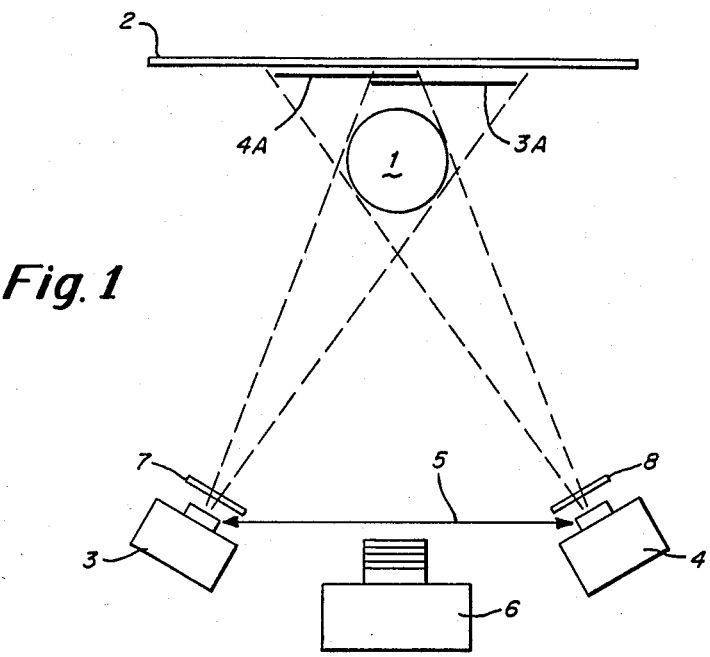
FIG. 1 illustrates the schematic embodiment of a preferred form of the invention.

The present invention is designed to creat a pseudo three-dimensional representation utilizing the shadows formed by energy sources impinging on the object from different angles to create a plurality of images with disparate shadows. This system is useful in conventional single-lens three-dimensional photography, three-dimensional medical imagery such as funding camera and X-rays, three-dimensional television, motion picture video tape, ultrasound and the like and like dynamic representations, as well as distance sensing devices such robotics and night vision detectors as well as computer generated imagery for such purposes as computer games and flight simulators. The method and means of the present invention are best understood by reference to FIG. 1. In this arrangement, a three-dimensional-like image of the object 1 is formed. The object 1 is positioned in front of an energy reflective background 2. A plurality of energy sources 3 and 4 are spaced apart at a selected distance 5. An image detector or recorder 6 is suitably located in optical alignment with the object 1. The schematic illustration of FIG. 1 represents a variety of different systems. Thus, for example, FIG. 1 represents a means and method of making a three-dimensional still photographs. In this system, the background 2 must be of light reflective material such as a white screen on which a shadow may be formed. The energy sources 3 and 4 may be conventional light sources of the type normally used for still photography illumination. In such cases, the light sources 3 and 4 should be sufficient as to cast shadows with shadow 3A formed by light source 3 and 4A by light source 4. Since the resulting image or images must be viewed with one eye observing the image or portion of the image created by the light source 3 and the other viewing separately the image created by the light source 4, additional means are required for appropriate separation of these images when viewed.

Several methods may be used to segregate the images created by the different light sources. Thus, for example, if a stereoptic device is to be used, two photographs may be taken successively while the object 1 remains stationary. The first is taken with the light source 3 only, and the second is taken with light source 4 only. The resulting pair of disparate two dimensional images may then be viewed through a conventional stereoscope device to achive three-dimensional imagery.

The system illustrated in FIG. 1 may also be used to create a three-dimensional image utilizing different color filters such, for example, as a blue/green filter 7 and an orange/red filter 8. The resulting photograph taken with a camera 6 using light sources 3 and 4 and the respective filters 7 and 8, simultaneously, will create a single image with overlapping disparate shadows of different chromatic valves. When viewed through a conventional color-coded eyeglass system of the type frequently used to three-dimensional viewing, with one blue/green and the other red/orange lens, the resulting image will have a three-dimensional effect. Since the image is taken without movement of the camera 6, and since the three-dimensional effect is created by two light sources 3 and 4 with a single lens camera 6, the resulting photograph, when viewed without lenses, has an appearance quite close to a conventional two-dimensional picture with 3-D encoded information and the resultant image overlap and blur confined to the shadows, and thus may be viewed as such without the aid of glasses and without substantial fuzziness or distortion.

The invention as illustrated in FIG. 1 also contemplates the use of polarizing filters 7 and 8 in place of chromatic filters. When such filters are used in conjunction with the light sources, spectacles with differently polarized lenses must be used.

As illustrated in the embodiments of FIG. 1, depth information is essentially encoded in the shadow disparity which is generated by the multiple point sources of energy which, in photography, are light sources. It is apparent that the same system may be used for other than conventional visible light including, for example, infrared photography. The system may in substance also be used for medical imagery including fundus camera, ultrasound and in three-dimensional X-ray imagery. In the X-ray application, the image detector and recorder is of course an X-ray plate which would replace the background element 2 and also the camera 6.

When a system is used in which the images are recorded sequentially, it is important to achieve good stabilization of the detector. Thus, the detector 6 must be fixed in relation to the object 1 and background 2 during the fixing of the image. Such fixing is less important when two images separated into two spectral bands such, for example, by two-color filters, are recorded on the camera at the same time.

In the embodiment of FIG. 1, the spacing 5 between the two light sources 3 and 4 may vary in distance apart, thus enhancing of reducing disparity. Preferably the lights should be at a distance which is somewhat greater than the interoccular distance. However, too great a distance apart may distort the depth perception being generated. Placing the energy sources on the same side of the image detector 6 will minimize flicker and distortion.

The system generally described in respect to FIG. 1 can also be used for use in sensing relative distances of several objects from robotic equipment to permit the robotic equipment to selectively manipulate the objects depending upon their distances. Thus, for example, the system may be used to permit the selection by a robotic arm of the most remote of several objects. In such a system the several objects will cast shadows that differ from each other because of their relative distance from the light sources. These comparative distances may be sensed by the image detector 6, which may in this case be a television camera. The comparative size or quality of the shadows may then be measured and detected by a suitable comparator and the derived information used as an imput control to robotic equipment. Such system will provide more accurate determination of relative distance and thereby minimize likelihood of error in the use of systems not utilizing this depth perception means.

It is also contemplated that the same system be used for imparting depth perception in Medical imaging. Thus, for example, the system of FIG. 1 may be used for imparting depth perception to mamographs. In such a system the energy sources general energy is in the ultrasonic frequency range. The reflected energy is then used to create depth enhanced images in an image detector 6 suitable for such purposes.

Figure 2:
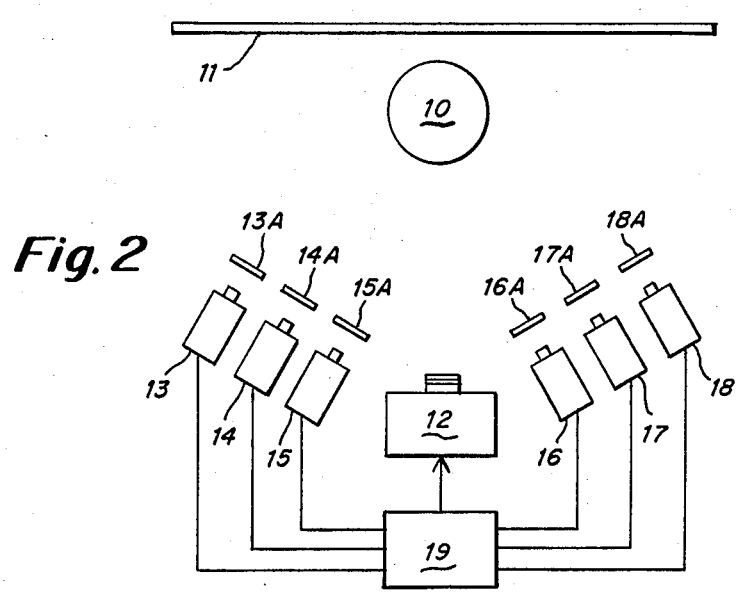
FIG. 2 illustrates schematically a modified form of the invention.

Depth perception for systems such as described in respect to FIG. 1 can be further enhanced by using more than two point sources of energy. This configuration is best illustrated in FIG. 2. In this arrangement, the object 10 is positioned before an energy reflective screen 11. The detector 12 is aligned with the object 10 and is suitably connected to a plurality of energy sources 13 to 18 through a suitable controller 19. The schematic illustration of FIG. 2 may be adapted for static imagery such as still photography or dynamic imagery such as motion pictures, television, video taping or the like. Thus, the image detector and recorder 12 may be a still camera, television camera, video camera or the like. In such cases, the energy sources 13 through 18 are light sources, and in such instances would be the visible spectrum. The light sources 13 through 18 are connected to an electronic time-controller 19. The electronic time-controller 19 is in turn connected electrically to the camera 12 by conventional means so that each time a photograph is taken by the camera 12 of the object 10, a successive light source 13 through 18 is triggered and the others are turned off. Thus, for example, in a motion picture film, six successive images of the object 10 will be taken utilizing successively light sources 13 through 18. While the embodiment of FIG. 2 specifically illustrates six light sources spaced uniformly apart and symetrical with respect to the camera 12, other variations of spacial-temporal combinations are possible. Additional light sources may be used to further enrich the depth information of the three-dimensional image. When this system is used with chromatically separated images, half of the light sources 13 through 18 will be filtered by filters of one color and the other half by filters of another color. These filters 13A through 18A may be divided into red/orange and blue/green and/or proportionally weighted filters with three of each appropriately selected. These images will present a conventional appearance when viewed without filtering glasses. However, when viewed with glasses having one lens red/orange and the other blue/green, a three-dimensional effect is perceived, or sensed by a special purpose processing device.

The embodiment of FIG. 2 may also be used without the filters 13A through 18A to provide a three-dimensional monocular display. In this configuration, monocular depth information is created by sequential presentation of picture frames taken at the rate of several frames per second in which the successive frames are each made with successive light sources 13 through 18.

Since the image 10 is recorded by a single source 12, there is no apparent flicker or movement of the object 10, which would otherwise occur with use of a monocular lens system. Depth perception is generated by use of shadow and thus any undesired flicker or blur movement is confined to the shadow rather than image movement. This use of more than two light sources distributes the shadow information over a sequence of shorter distances, thus providing a smoother appearance to the depth perception.

Figure 3A:
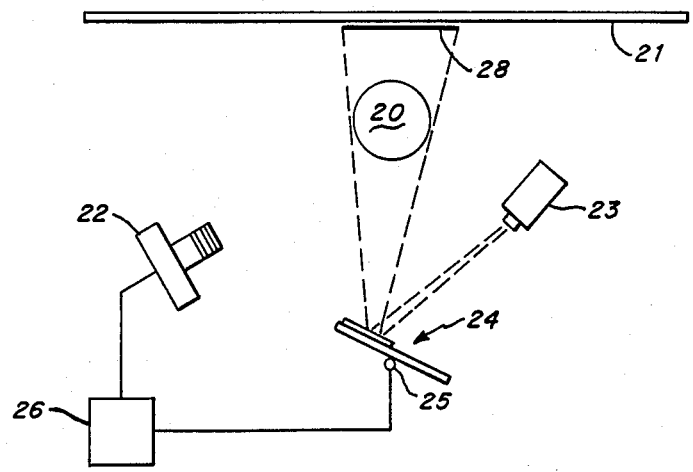
FIGS. 3A and 3B illustrate a specific embodiment of the invention in schematic form.
Figure 3B:
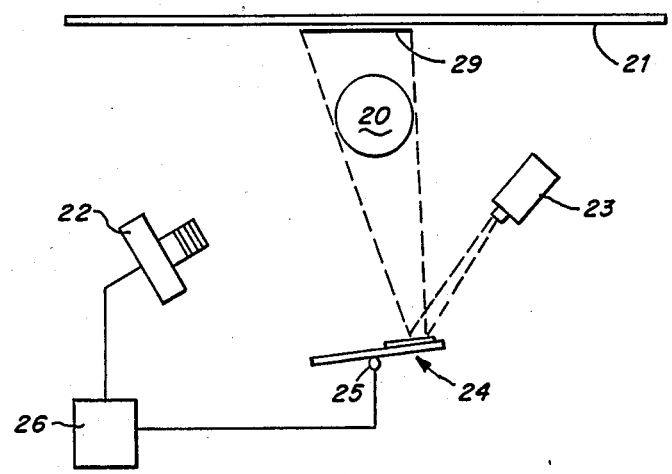

Referring now to FIGS. 3A and 3B, another system for creating a three-dimensional image is illustrated schematically utilizing a single energy source and a single image recorder. In this arrangement, the object 20 is positioned before a reflective background 21. A single image detector and recorder 22 such as a motion picture camera is aligned with the object 20. An energy source 23 such as a light beam is aligned with a mirror or energy reflecting device 24 suitably supported on a pivot 25 that is appropriately connected electrically by a controller 26 to the camera 22. The controller 26 is designed to move the mirror from the angle illustrated in FIG. 3A to the angle illustrated in FIG. 3B with each advancing of frame of the recording film in the camera 22. In operation, the mirror 24 moves from the position illustrated in FIG. 3A to the position illustrated in FIG. 3 and back again, etc. with each successive frame of picture taking. Thus, with each successive frame taken, the shadow cast by the light from the light source 23 will move on the background 21 between positions 28 and 29.

The configuration illustrated in FIGS. 3A and 3B work essentially on the same principle as that shown in FIG. 1. However, by using a single light source 23 and an oscillating mirror 24 rather than two light sources 3 and 4 as illustrated in FIG. 1, the problem of matching the luminance of different light sources is avoided. Thus, in the embodiment in FIG. 1, the use of separate light sources 3 and 4 requires careful matching of the lumens of these light sources to minimize flicker. A similar system as that illustrated in FIG. 1 may be used in which a common electric driver connected to the light sources 3 and 4 is provided with a feedback system having a light detector. Such a feedback system controls the power to the light sources 3 and 4 in order to assure uniform illumination from each of the light sources 3 and 4.

Figure 4:
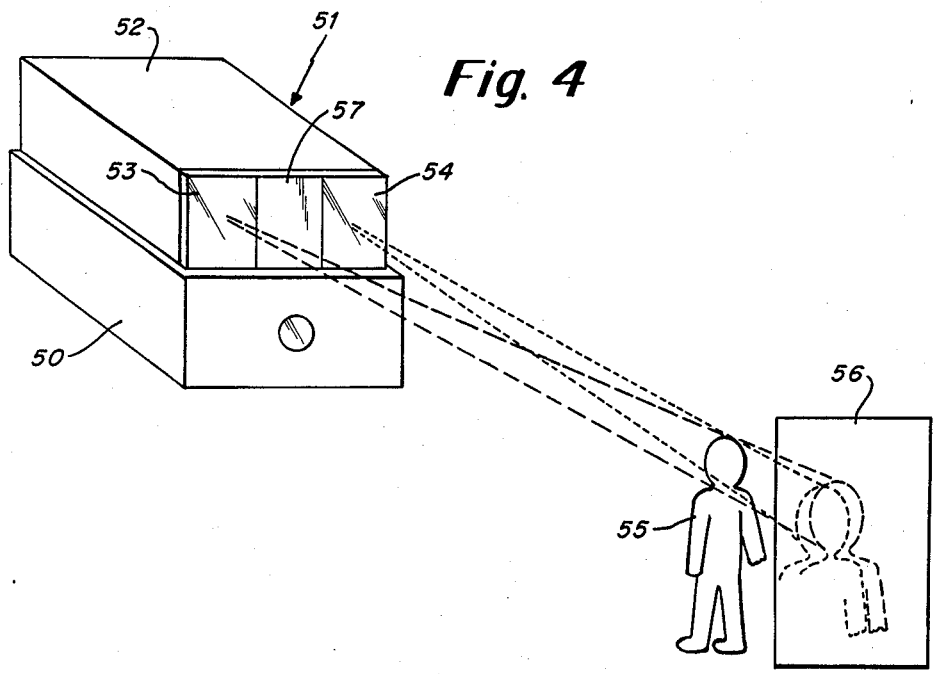
FIG. 4 is a perspective view of a camera and flash attachment with a preferred embodiment of the present invention, schematically illustrated.
Figure 5:
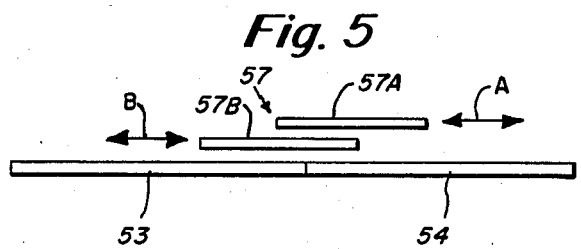
FIG. 5 is a schematic plan view of a preferred embodiment of the present invention and FIGS. 6 through 9 inclusive, are diagrams illustrative of sterioptic system within the prior art and systems embodying the present invention.

Referring to FIG. 4 there is illustrated an embodiment of the invention for use with a still camera which may, for example, comprise an instant camera that produces a photograph directly without a negative, or a conventional camera such as 35 millimeter cameras which produce negatives or slides. The conventional camera 50 has attached to it a conventional flash attachment 51 with a standard or conventional means for generating light flashes over a conventional wave bank. An attachment 52 covers the light emitting surface of the flash attachment 51. This attachment 52 comprises the filter having a cyan filter section 53 and a red filter section 54. Filters of other complementary wave bands may be used but a red/cyan combination is preferred. In utilizing this system it is preferred that the primary light source comprises the flash 51, although the invention can and will work with ambient light and other light sources in addition to the light sources from the flash 51. The greater the relative amount of light from the flash 51, however, the greater the three-dimensional effect achieved. The invention is designed primarily for indoor use and preferrably against a screen or wall. In the use of this invention, an object 55 is arranged before a screen 56, preferably white or of a color contrasting with both wave bands of the filter sections 53, 54 such that shadows will readily be apparent in the photograph taken. The distance between the object and the screen 56 should be such that shadows from the object will be projected onto the screen and will be imaged onto the picture taken by the camera 50. A picture taken with the camera 50 and flash 51 using the filter 52 will appear as a conventional photograph when viewed with the naked eye. The shadows in such photograph as illustrated in the attached exhibit is essentially conventional and do not effect the image of the object or substantially distort the image of the shadows. The lens cover may comprise any combination of complementary filters within the range of the visible spectrum. However, for optimum sensitivity, the spectral sensitivity of the filter should be the same as the film to the extent possible to avoid color overlaps or cross-talk in the separate shadows being created.

The filters 53 and 54 are separated by an opaque section 57. This opaque section has a width that depends upon the distance of the object to the camera. As a rule of thumb, the distance of the object to the camera should be between 10 and 100 times the width of the opaque section 57. Thus, for example, a filter with an opaque section having a width between one centimeter and 10 centimeters should be used to take a picture of an object at a distance of one meter. It is, therefore, preferable to provide a lens cover 52 in which the opaque section 57 is provided by an adjustable opaque screen 57A and 57B that move in the direction of the arrows A and B, thus providing adjustable widths of the opaque section 57 depending upon the distance of the object from the camera. There are some inherent limitations on the overall dimensions in which the present system may be used. For example, the opaque screen 57 should not be too wide or else the shadows that are formed by the two filters will not merge in the perception of the viewer. Further, if the screen is too far from the subject, the shadows will separate and not appear to merge when viewed. Thus, the screen in which the shadow falls, should preferably be not too far behind the object. In the illustration set forth above, the screen should be at least as close to the object as the object is to the camera.

Since blue filters absorb more light than red filters, it is preferable to use a blue filter which is somewhat larger than the red filter, if a blue/red filter is being used. Alternately, filters may be selected in which the absorption is approximately the same in each segment, thus, if a red/cyan filter is used, the filter sizes may be approximately the same. The flash source 51 may be of any conventional type, but preferably the light should eminate from a point source in order to achieve the sharpest image.

In some instances, especially when a flash has been designed specifically for a particular camera, the addition of a flash cover will reduce the amount of light transmitted enough to affect the quality of the photographs being taken. In such instances, the light source must be adjusted to increase the light intensity to overcome the amount of light being absorbed by the flash cover or, alternately, an ancillary light source will have to be used.

Figure 6:
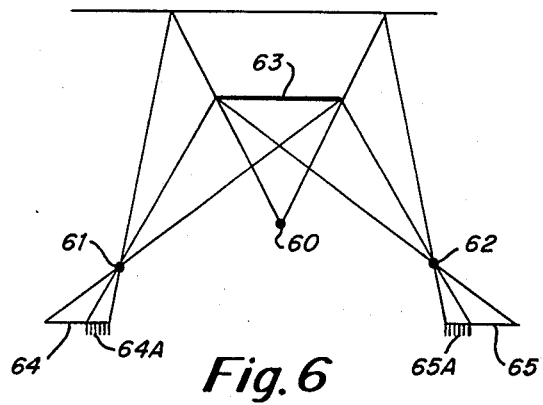
Figure 7:
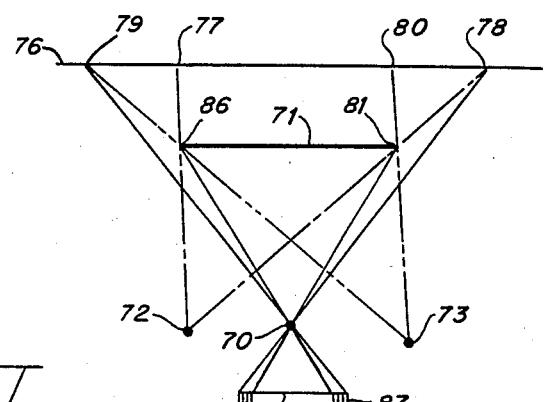
Figure 8:
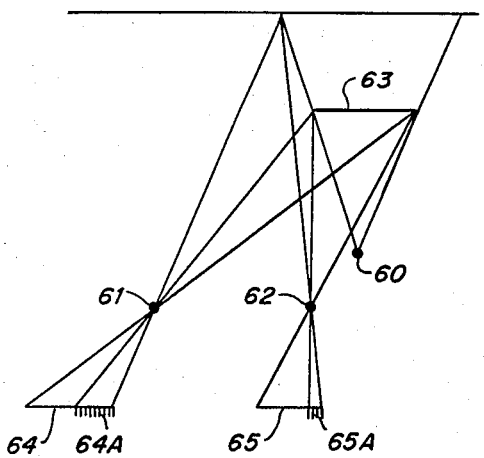
Figure 9:
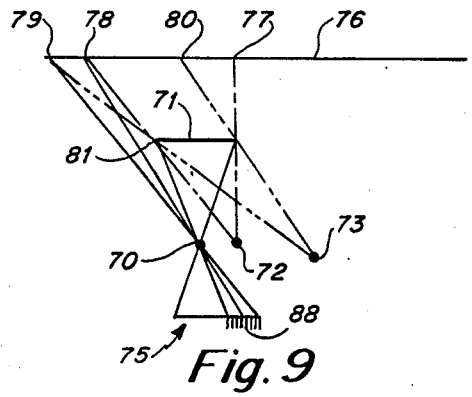

In FIGS. 6, 7, 8 and 9 there are illustrated schematically a method in which the present invention functions in comparision with the prior art systems. FIGS. 6 and 8 illustrate conventional prior art stereoscopic systems utilizing a single light source, 60 and two cameras 61 and 62. FIGS. 6 illustrates such a system when the cameras are symmetrical with respect to the object 63 - light source 60 axis, while FIG. 8 illustrates the function of such a system when the object is laterally displaced with respect to the light source 60. In these systems, two photographic images are created at 64 and 65. In image 64, one shadow 64A is imaged by camera 61 which picks up the shadow of the object 63 from a vantage point to the left of camera 62 while camera 62 picks up the shadow 65A from a vantage point to the right of camera 61. In both of these cases, the shadows are formed by a single light source and, therefore, two separate images are required, which images must be merged for viewing with a stereoscopic system with each of the photographs 64 and 65 only partially containing the recorded image. In FIGS. 7 and 9 the system of the present invention is illustrated. In FIG. 7 a single camera 70 is located in front of the object 71 and two light sources 72 and 73 are located symetrically to the camera-object axis. In FIG. 9, the camera 70 remains symmetrical with respect to the object 71, but the light sources 72 and 73 have been displaced to one side. In both of these uses of the invention, a single image 75 is produced. The image 75 contains all of the shadow information necessary for three-dimensional viewing through an appropriate filter system, but nonetheless, when viewed without a filter, provides an integrated picture which is readily observable without significant distortion. As illustrated in FIGS. 7 ano 9, the light source 72 creates a shadow on the screen 76 from point 77 to point 78 while light source 73 creates a shadow from point 79 to point 80. The camera 70 picks up that angular portion of the shadow created by light source 72 from point 81 to point 78. This shadow is imaged on the film at 83. Similarly, the shadow from point 79 to point 86 is imaged on the film 75 at 87 in FIG. 7 and in FIG. 9 a portion of the shadow cast by light source 73 from point 81 to point 79 is imaged on the film 75 at 88 and 83.

It is clear by comparing FIGS. 6 and 7, and FIGS. 8 and 9 that the resulting images on the film are identical. Therefore, it makes no difference if one uses two light sources and one camera (versus two cameras and one light source) insofar as the three dimensional percept is concerned.

This invention also contemplates synthesizing images having a three dimensional appearance for use in such equipment as computer operated games and flight simulators. In such computer generated imagery an algorithm is developed to generate two images of a desired object with each image simulating the object as viewed from the same locus. However, the images are each synthesized as if illuminated with a light source eminating from different locations.

The images thus created each have shadows that are qualitatively different one from the other. These separate images may then be viewed as either static or dynamic images.

If viewed as static images, two may be stereoptically displayed in a conventional manner. If color is used an anaglyph system may be employed by creating the images with chromatically distinctive shadows in the manner described above, in which mutually distinctive color filters such as red and blue are used with the viewer observing the images simultaneously through one blue and one red filter.

When dynamically displayed, a monocular system may be used. Here the images are successively displayed at least several per second to create an appearance of motion in a fashion similar to a motion picture television system. However, successive images with different simulated light sources are displayed.

The single lens 3-D concept and technology described in this patent application is also directly applicable to airborne surveylance systems. In this specific application, infrared (IR) and visible imaging for low level surveylance and search flights of light planes, RPV, helicopters and gunships are contemplated. In one embodiment, a pair of IR sources is mounted on the aircraft, spaced at a distance L from each other. An IR camera is mounted anywhere on the aircraft so that it is directed toward the IR illuminated field. Similar to the single lens 3-D photograph, means are provided for the segration of the images generated by the two sources so that each image is channeled to one eye of the observer (pilot).

This technique extends the aircraft to ground distance (L) over which depth (binocular) information can be extracted by the observer. Denoting the interocular distance by 1, the range is extended by L/1.

A variant of the technique is obtained with the application of multiple IR sources. This for example, can provide also depth information along an axis perpendicular to the one of normal depth (determined by the center of both eyes) or along any preferred axis.

The concept and technology are not limited to IR light. In the case of visible light, the technique permits in fact direct viewing with depth, the only requirement being to wear goggles with shutters synchronized to the light sources.

We claim:

1. A camera flash attachment comprising a light source a pair of filters for transmitting visible light in separate wavebands and means securing said filters in adjacent relation, to each other and over said camera flash attachment to simultaneously filter light from said camera flash attachment whereby light from said flash attachment passing through said pair of filters will create two sets of shadows having distinctive characteristics defined by said separate wavebands.

2. The combination of claim 1 wherein an opaque segment is positioned between said pair of filters.

3. The combination of claim 2 wherein one of said pair of filters is a red filter and the other is cyan.

4. The combination of claim 3 wherein said opaque segment includes means for adjusting the width thereof.

5. The combination of claim 1 further including means for three-dimensional viewing of images formed using said filter including a pair of viewing filters, means for support said filters at an interocular distance for viewing the image therethrough, said viewing filters comprising filters for said separate wave bands.

6. The combination of claim 4 wherein the width of the opaque segment is variable by a factor of 10.

* * * * *